United States Patent Office 3,255,267
Patented June 7, 1966

3,255,267
ALKYLATION OF CYCLOPENTADIENES
Henry E. Fritz and David W. Peck, Charleston, W. Va., assignors to Union Carbide Corporation, a corporation of New York
No Drawing. Filed Sept. 10, 1962, Ser. No. 222,692
28 Claims. (Cl. 260—666)

This invention relates to the alkylation of cyclopentadienes. More particularly, this invention relates to a process for the alkylation of cyclopentadienes which comprises reacting cyclopentadiene or an alkylcyclopentadiene with a primary or secondary alcohol in the presence of a highly alkaline catalyst.

According to the process of the instant invention, a member selected from the group consisting of cyclopentadiene, 1-alkylcyclopentadiene, and 2-alkylcyclopentadiene is reacted with a primary or secondary alcohol in the presence of a highly alkaline catalyst such as potassium or sodium hydroxide or alkoxide.

When cyclopentadiene is reacted with a secondary alcohol, the cyclopentadiene is alkylated first in either the 1- or 2-position. The 1-isomer is then further alkylated in either the 3- or 4-position, while the 2-isomer is further alkylated in the 4-position. This results in the formation of a mixture of the 1,3-, 1,4- and 2,4-isomers, as well as the 1- and 2-isomers. The 2,4-isomer is, of course, identical with the 1,3-isomer. Alkylation of cyclopentadiene in these positions is entirely unexpected because these positions are not the site of an active methylene group as is the 5-position, and therefore would not be expected to react in preference to the 5-position under the conditions of the reaction. The reactions in the case of linear secondary alcohols proceed in the manner depicted by the following graphic equations:

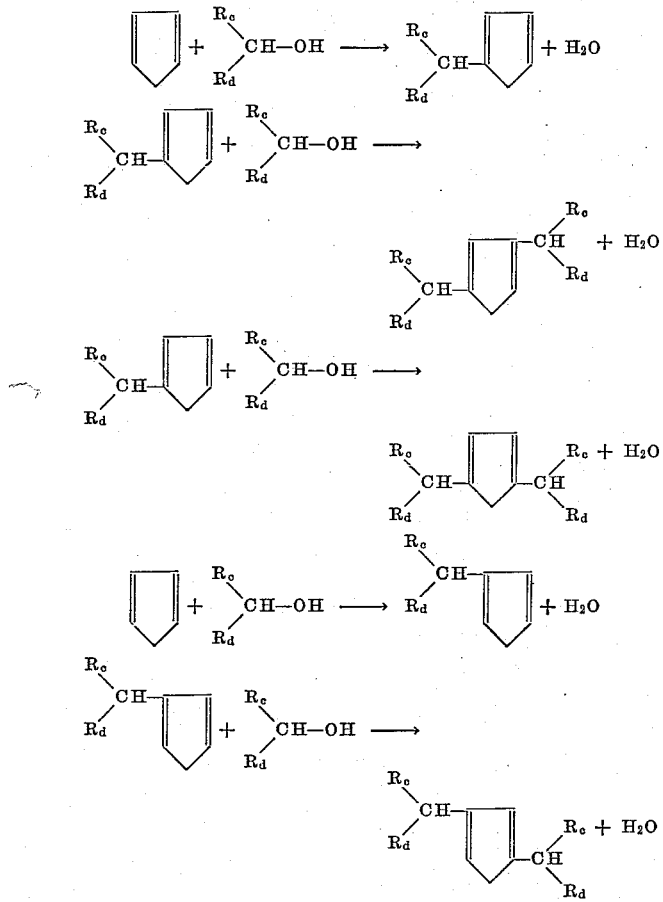

wherein $R_c$ and $R_d$ are hydrocarbon radicals free of aliphatic unsaturation, including alkyl and aryl radicals, said radicals having 1 to 10 carbon atoms preferably from 1 to 8 carbon atoms. When cyclic secondary alcohols are employed, i.e., alcohols in which the hydroxyl radical is attached to a secondary carbon atom in a cycloalkyl ring, the reaction proceeds in a similar manner. The cyclic alcohols employed may be represented by the formula:

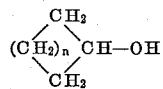

wherein $n$ is an integer having a value of from 0 to 10, preferably from 2 to 4.

The monoalkylated cyclopentadiene compounds dimerize with themselves and cyclopentadiene at temperatures above about 200° C. to produce dimers and codimers which exist in both the endo and exo form. At temperatures of from about 25° C. to about 75° C. the endo form is favored. The endo form is less stable than the exo form and dedimerizes readily at temperatures of from about 160° C. to about 180° C.

In addition to monoalkylated and dialkylated cyclopentadiene, a certain amount of trialkylated cyclopentadiene, i.e., the 1,2,4- and 1,3,5-alkylated products, are also formed by the above process. Side reactions also result in the formation of a certain amount of 3-alkylidenecyclopentene and 1-alkyl-3-alkylidenecyclopentene. In the case of linear secondary alcohols these side reactions may be depicted by the following graphic equations:

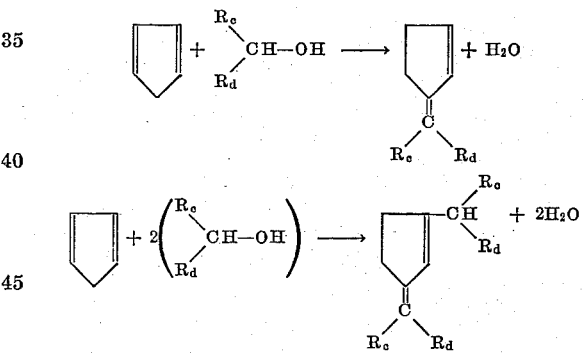

wherein $R_c$ and $R_d$ are as above defined. When cyclic secondary alcohols are employed, the reactions proceed in a similar manner and the corresponding products are formed.

If desired, it is possible to start with a 1-alkyl-cyclopentadiene or a 2-alkylcyclopentadiene, or a mixture of both, instead of cyclopentadiene itself as starting material. In such case the reactions proceed in a manner similar to that described above. The 1-alkylcyclopentadiene is alkylated first in either the 3- or 4-position. The 1,3-isomer which results is then further alkylated in either the 4- or 5-position to produce the 1,3,4- and 1,3,5-isomers. The 1,4-isomer likewise is further alkylated in either the 2- or 3-position to produce the 1,2,4- and 1,3,4-isomers. This results in the formation of a mixture of the 1,3-, 1,4-, 1,2,4-, 1,3,4-, and 1,3,5-isomers. The 1,3,4-isomer can, of course, be numbered 1,2,4-.

The 2-alkylcyclopentadiene is alkylated first in the 4-position, and the resulting isomer is then further alkylated in either the 1- or 5-position. This results in the formation of a mixture of the 2,4-, 1,2,4-, and 2,4,5-isomers. The 2,4-isomer can, of course, be numbered 1,3-. The 2,4,5-isomer can likewise be numbered 1,3,5-.

The reactions of 1-alkylcyclopentadienes and 2-alkylcyclopentadienes with linear secondary alcohols can be depicted by the following graphic equations:

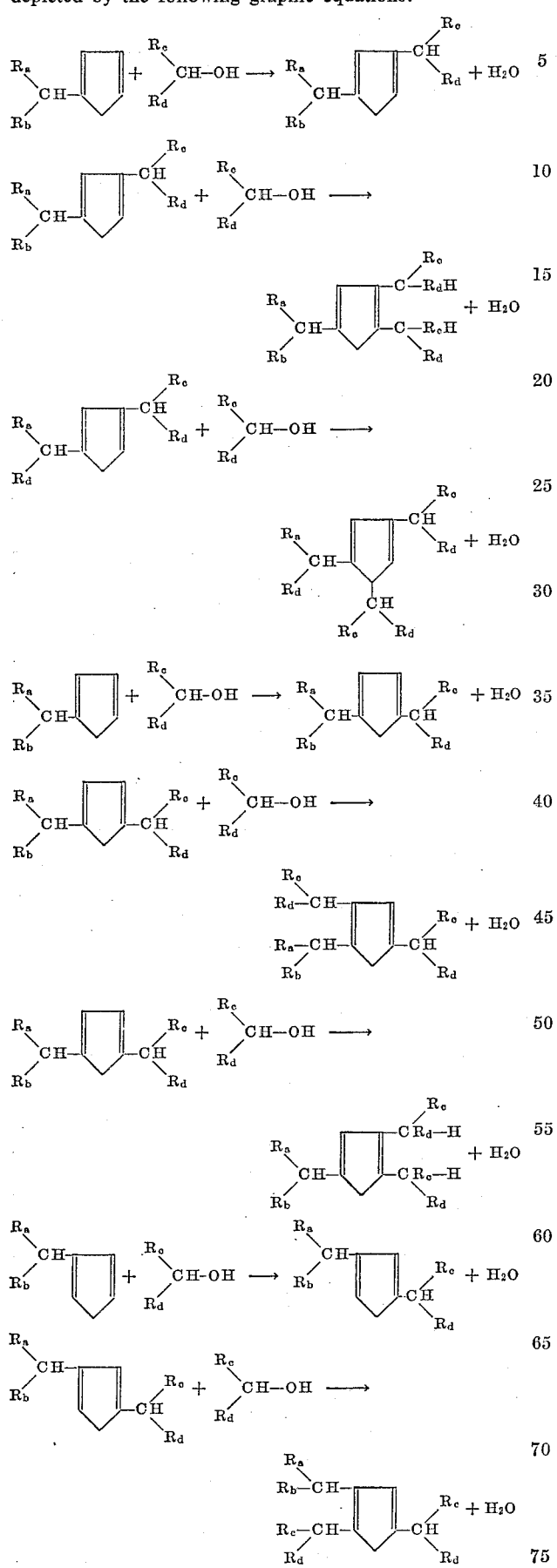

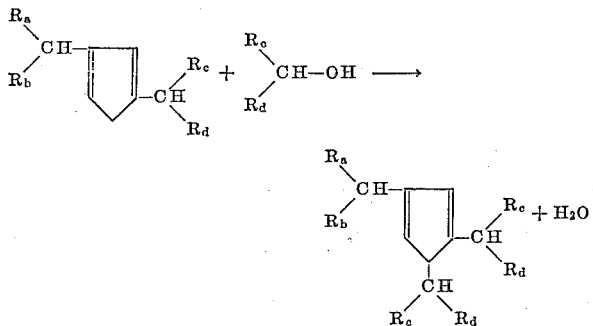

wherein $R_a$ and $R_b$ are radicals selected from the group consisting of hydrogen and alkyl radicals having from 1 to 10 carbon atoms, preferably from 1 to 8 carbon atoms; and $R_c$ and $R_d$ are as above defined. When cyclic secondary alcohols are employed, the reaction proceeds in a similar manner.

When a primary alcohol having from 2 to 11 carbon atoms is reacted with cyclopentadiene in place of a secondary alcohol, there is produced a mixture of alkylated cyclopentadienes which are alkylated in the 1-, 2-, 3-, and 4-positions. The monoalkylated product is a mixture of the 1-alkylated and 2-alkylated isomers. The dialkylated product is a mixture of the 1,3- and 1,4-isomers, while the trialkylated product is alkylated in the 1-, 2-, and 4-positions, and the tetraalkylated product is alkylated in the 1-, 2-, 3-, and 4-positions. Alkylation of cyclopentadiene with the primary alcohols employed in the instant invention to produce the products described is entirely unexpected for the reason that when alkylation of cyclopentadiene with methanol was attempted, only a tarry product was obtained.

Many of the products produced by the process of the instant invention are novel compositions. Among the novel products are those represented by the formulas:

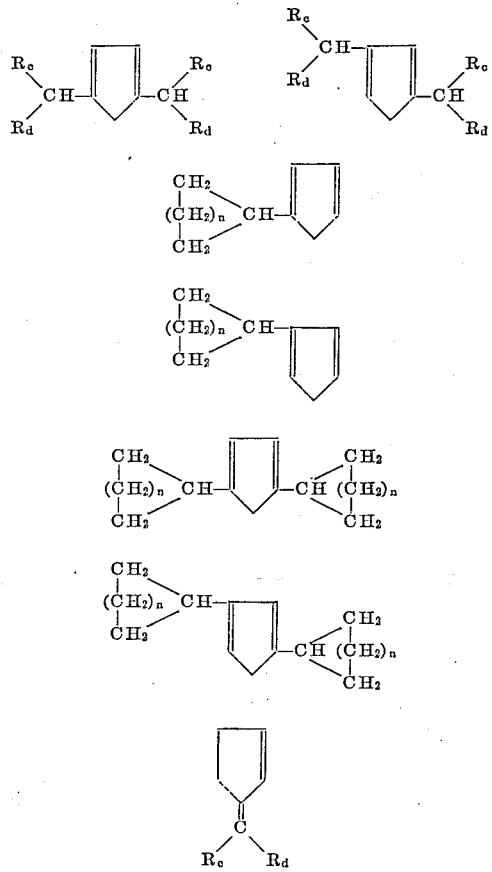

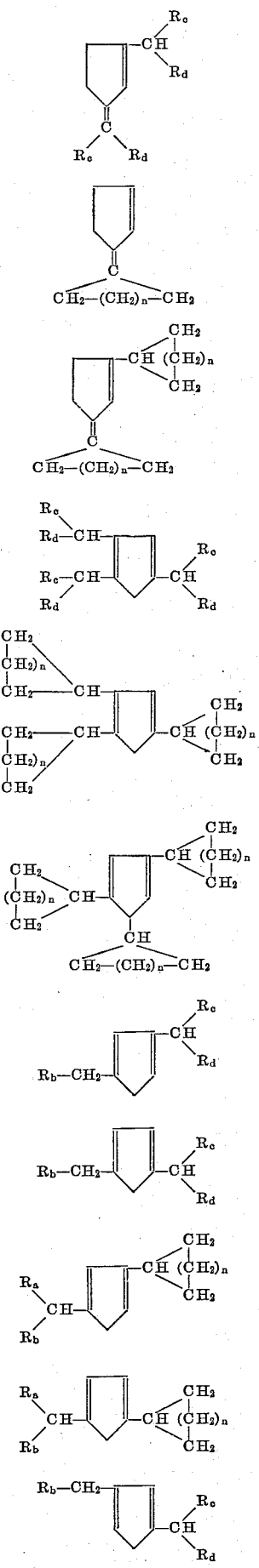

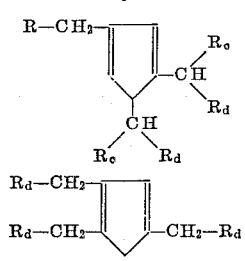

wherein $R_a$, $R_b$, $R_c$, $R_d$, and $n$ are as above defined.

In order to effect reaction between a cyclopentadiene and a primary alcohol or secondary alcohol according to the process of the instant invention, the presence of a highly alkaline metal alkoxide or hydroxide, or other strongly alkaline material, in the reaction mixture is necessary. The alkoxide or hydroxide is preferably an alkoxide or hydroxide of sodium or potassium, although other alkoxides and hydroxides, such as the alkoxides and hydroxides of rubidium and cesium can also be employed. The metal alkoxide or hydroxide can be employed in an amount from as low as about 0.01 mole percent to as high as about 200 mole percent, preferably from about 5 mole percent to about 50 mole percent, of the cyclopentadiene employed, or if desired, in strictly catalytic amounts. Amounts of the metal alkoxide or hydroxide of from about 0.01 mole percent to about 20 mole percent, preferably from about 0.1 mole percent to about 5 mole percent, of the cyclopentadiene employed, are completely satisfactory.

The alcohols employed as starting materials can be depicted by the general formulas:

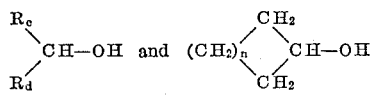

wherein $R_c$ is a member selected from the group consisting of hydrogen and hydrocarbon radicals free of aliphatic unsaturation, including alkyl and aryl radicals, said radicals having from 1 to 10 carbon atoms, preferably from 1 to 8 carbon atoms; $R_d$ is a hydrocarbon radical free of aliphatic unsaturation, including alkyl and aryl radicals, said radicals having from 1 to 10 carbon atoms, preferably from 1 to 8 carbon atoms; and $n$ is an integer having a value of from 0 to 10, preferably from 2 to 4. Illustrative of such starting materials are such compounds as isopropanol, 3-ethyl-2-pentanol, 3-ethyl-2-octanol, 5-ethyl-2-nonanol, cyclopentanol, cyclohexanol, cycloheptanol, 1-phenylethanol, ethanol, propanol, butanol, 2-ethylbutanol, 2-ethylhexanol, 2-phenylethanol, undecanol, and the like. Ethanol is by far the most preferred primary alcohol since the yields obtained with this alcohol are much in excess of the yields obtained when employing other primary alcohols.

The cyclopentadienes employed as starting materials can be depicted by the general formulas:

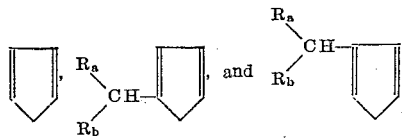

wherein $R_a$ and $R_b$ are radicals selected from the group consisting of hydrogen and alkyl radicals having from 1 to 10 carbon atoms, preferably from 1 to 8 carbon atoms. Illustrative of such starting materials are such compounds as cyclopentadiene, 1-methylcyclopentadiene, 2-methylcyclopentadiene, 1-ethylcyclopentadiene, 2-ethylcyclopentadiene, 1-isopropylcyclopentadiene, 2-isopropylcyclodiene, 1-isobutylcyclopentadiene, 2-isobutylcyclopentadiene, 1-octylcyclopentadiene, 2-octylcyclopentadiene, 1-decylcyclopentadiene, 2-decylcyclopentadiene, and the like. Dimers of such compounds can also be employed since they readily decompose to produce the monomer when heated at 160° C. or higher. The monomer produced then reacts with the alcohol as explained above.

When effecting reaction according to the process of the instant invention, it is preferable to employ a substantial excess of alcohol over the stoichiometric amount required in order to effect complete reaction of the cyclopentadiene. Amounts of alcohol of from 1 to 10 times the stoichiometric equivalent are preferred for this purpose, but amounts of from as little as 0.1 mole to as much as 100 moles of alcohol per mole of the cyclopentadiene present can also be employed. When an excess of alcohol is employed, the alcohol acts as a solvent as well as functioning as a reactant.

The process of the instant invention may be conducted in either a batchwise or continuous manner. When a batch procedure is employed, reaction is usually effected in a closed system under autogenous pressure. When the process is conducted continuously, the reactants are usually fed through a pressurized reactor. In general, whether the process be conducted continuously or in a batchwise manner, the pressure can range from as low as about 100 p.s.i. to as high as about 10,000 p.s.i., with the most suitable pressures ranging from about 1,000 p.s.i. to about 5,000 p.s.i.

Reaction according to the process of the instant invention readily occurs at temperatures ranging from as low as about 210° C. to as high as about 350° C., but is preferably effected at temperatures ranging from about 250° C. to about 300° C.

The reaction time is not narrowly critical, but longer reaction times usually result in greater alkylation of the starting cyclopentadiene, provided other reaction conditions are kept constant. Reaction times of from about 0.5 to about 10 or more hours, preferably from about 1 to about 2 hours, are satisfactory for batch operations. When the reaction is conducted continuously, the rate of flow of the reactants through the reactor is preferably regulated so that from about 0.5 to about 100, most preferably from about 5 to about 40, liters of reaction mixture per liter of reactor volume pass through the system each hour. The ratio of the liters of reaction mixture to liter of reactor volume passing through the system in 1 hour is known as the liquid hourly space velocity.

The products produced by the process of the instant invention can be recovered from the reaction mixture by conventional techniques. These products can be hydrogenated to produce high temperature fuels, while their sodium salts can be treated with ferric salts to produce sandwich-type compounds which are used as antiknock agents in gasoline. These compounds can also be epoxidized, polymerized, and used as intermediates for a whole host of new chemical compounds, as is obvious to one skilled in the art.

The following examples are set forth for purposes of illustration so that those skilled in the art may better understand this invention, and it should be understood that they are not to be construed as limiting this invention in any manner.

*Example 1.—Preparation of diisopropylcyclopentadiene*

To a three-liter stainless steel rocking autoclave were charged 215 grams of dicyclopentadiene (1.6 moles), 600 grams of isopropanol (10 moles), and 100 grams of 85 percent by weight potassium hydroxide (1.5 moles). The autoclave was sealed and heated at a temperature of 250±10° C. for 10 hours. At the end of this time, the reaction mixture was cooled, washed with water several times until the wash water was neutral to pH paper, and then distilled. About 121 grams of diisopropylcyclopentadiene (0.81 mole), boiling at a temperature of 113° C. to 114° C. at 100 mm. Hg pressure, were collected. This represented a yield of 25 percent of theoretical.

*Example II.—Preparation of diisopropylcyclopentadiene*

To a three-liter stainless steel rocking autoclave were charged 215 grams of dicyclopentadiene (1.6 moles), 600 grams of isopropanol (10 moles), and 100 grams of 85 percent by weight potassium hydroxide (1.5 moles). The autoclave was sealed and heated to a temperature of 247° C. over a period of 2 hours and 45 minutes, and then maintained at a temperature of 247±3° C. for 2 hours. At the end of this time, the reaction mixture was filtered to remove traces of solid impurities. The filtrate obtained from the filtration was diluted with 2 liters of water, causing an oily layer to separate. This layer was removed and washed with water several times until the wash water was neutral to pH paper. The oil was then distilled, and 231 grams of diisopropylcyclopentadiene (1.54 moles) were collected. This represented a yield of 47 percent of theoretical.

*Example III.—Preparation of diisopropylcyclopentadiene*

A sixteen-foot length of coiled stainless steel tubing having an inner diameter of ⅜ inch and a volume of 350 cc., along with an attached receiver, was pressurized to a pressure of 4,000 p.s.i. at a temperature of about 230° C. After a prerun feed was fed through the tubing, a solution of 32 grams of potassium hydroxide (0.57 mole) in 235 grams of isopropanol (3.9 moles) was fed to the system along with a separate solution of 154 grams of dicyclopentadiene (1.16 moles) in 173 grams of isopropanol (2.9 moles), at a liquid hourly space velocity of 0.5 while the temperature and pressure were maintained constant.

The reaction product which emerged from the coil was extracted with water several times. The water-insoluble fraction amounted to 242 grams. A portion of this fraction, amounting to 163 grams, was distilled, and 44 grams of diisopropylcyclopentadiene (0.29 mole), boiling at a temperature of 81° C. to 108° C. at 50 mm. Hg pressure, were collected. This represented a yield of 19 percent of theoretical.

*Examples IV to X.—Preparation of diisopropylcyclopentadiene*

The procedure of Example III was repeated several times employing essentially the same reaction conditions. Hydrogen was used as the pressurizing gas in some instances and nitrogen was used in others. In Examples VI to X one feed stream consisted of dicyclopentadiene and the other consisted of a solution of potassium hydroxide in isopropanol. Hexane was added during the water extraction in Examples VI to X to aid in the separation of the water-insoluble products, and was removed by distillation. Other differences in reaction conditions, as well as the yields of diisopropylcyclopentadiene obtained, are shown in Table I below:

TABLE I

| Example No. | Temperature ° C. | Pressure p.s.i. | Liquid Hourly Space Velocity | Mole Ratio of Isopropanol to Dicyclopentadiene | Weight Percent of KOH in Reaction Mixture | Yield of Diisopropylcyclopentadiene, Percent of Theory |
|---|---|---|---|---|---|---|
| IV | 250 | 4,000 | 1.0 | 6 | 8 | 13 |
| V | 250 | 4,000 | 1.5 | 5 | 6 | 18 |
| VI | 210 | 4,000 | 5 | 19 | 6 | 8 |
| VII | 230 | 4,000 | 5 | 19 | 6 | 16 |
| VIII | 250 | 4,000 | 5 | 19 | 6 | 56 |
| IX | 270 | 4,000 | 5 | 19 | 6 | 56 |
| X | 290 | 4,000 | 20 | 19 | 6 | 46 |

Refined diisopropylcyclopentadiene obtained by the procedures of Examples I thorugh X has been found to have a boiling point of 117° C. at 100 mm. Hg pressure, an index of refraction of 1.4650 at 20° C., a density of 0.823 at 20° C., and a molecular weight of 149 (calculated, 150), as determined by the freezing point depression of benzene. The infrared and ultraviolet spectra of this product are consistent with that of diisopropylcyclopentadiene, and nuclear magnetic resonance studies showed the presence of 1,3-diisopropylcyclopentadiene and 1,4-diisopropylcyclopentadiene. The product was further identified by elemental analysis.

*Analysis.*—Calculated for $C_{11}H_{18}$: C, 88.0%; H, 12.0%. Found: C, 87.8%; H, 11.7%.

*Example XI.—Preparation of isopropylcyclopentadiene*

The forecuts from the distillation of the diisopropylcyclopentadiene of Examples VI and VII were combined and redistilled. About 21 grams of isopropylcyclopentadiene (0.19 mole), boiling at a temperature of 63° C. to 66° C. at 100 mm. Hg pressure, were collected. This represented a yield of 4.7 percent of theoretical. The infrared and ultraviolet absorption spectra of this product are consistent with that of isopropylcyclopentadiene. Nuclear magnetic resonance studies of refined isopropylcyclopentadiene showed the presence of 1-isopropylcyclopentadiene and 2-isopropylcyclopentadiene. This product has a boiling point of 123° C., an index of refraction of 1.4580 at 20° C., and a density of 0.816 at 20° C.

*Example XII.—Preparation of 3-isopropylidenecyclopentene*

The crude diisopropylcyclopentadiene of Examples V and VIII to X were combined and redistilled. About 12 grams of 3-isopropylidenecyclopentene (0.11 mole), boiling at a temperature of 66° C. to 68° C. at 50 mm. Hg pressure, were collected. This represented a yield of 1.4 percent of theoretical. The ultraviolet absorption spectrum and infrared spectrum of this product are consistent with that of 3-isopropylidenecyclopentene. After being refined by vapor chromatography, this product had an index of refraction of 1.5025 at 20° C. Hydrogenation of this compound gave isopropylcyclopentane.

*Example XIII.—Preparation of 1-isopropyl-3-isopropylidenecyclopentene*

To a five-gallon rocking autoclave were charged 1200 grams of 97 percent by weight of dicyclopentadiene (8.8 moles), 3600 grams of isopropanol (60 moles), and 680 grams of 85 percent by weight potassium hydroxide (10.3 moles). The autoclave was sealed and heated at a temperature of 235° C. for 2 hours. At the end of this time, the reaction mixture was cooled and diluted with 8 liters of water and 8 liters of isopropyl ether. Two distinct phases formed, a water phase and an ether phase, and these were separated. The ether was removed from the ether phase by distillation at atmospheric pressure. The experiment was repeated seven times. The residue from the distillations were combined and distilled under reduced pressure. About 3980 grams of distillate were collected. The distillate was redistilled, and 1000 grams of 1-isopropyl-3-isopropylidenecyclopentene (6.67 moles), boiling at temperature of 79° C. to 90° C. at 10 mm. Hg pressure, were collected. This represented a yield of 4.6 percent of theoretical. The product was identified by nuclear magnetic resonance studies and elemental analysis.

*Analysis.*—Calculated for $C_{11}H_{18}$: C, 88.0%; H, 12.0%. Found C, 88.2%; H, 11.8%.

Refined 1-isopropyl-3-isopropylidenecyclopentene has a boiling point of 81° C. at 10 mm. Hg. pressure, an index of refraction of 1.5015 at 20° C., a density of 0.843 at 20° C., and a molecular weight of 144 (calculated, 150), as determined by the freezing point depression of benzene.

*Example XIV.—Preparation of isopropylcyclopentadiene and diisopropylcyclopentadiene*

The procedure of Example III was repeated at a temperature of 290° C. and at a liquid hourly space velocity of 8.7 while employing a mole ratio of isopropanol to dicyclopentadiene of 13 and a potassium hydroxide concentration of 5.6 percent by weight.

A portion of the reaction product was extracted with water several times, with hexane being added to hasten separation of the water layer. The hexane was removed from the water-insoluble portion by distillation at atmospheric pressure and the residue was distilled under reduced pressure. Both isopropylcyclopentadiene and diisopropylcyclopentadiene were recovered by the distillation.

A second portion of the reaction product was distilled under atmospheric pressure to remove unreacted isopropanol, and then distilled under reduced pressure. Diisopropylcyclopentadiene was recovered by the distillation.

A third portion of the reaction product was distilled under atmospheric pressure in order to remove unreacted isopropanol. The residue was divided into two parts. One part was distilled under reduced pressure, and diisopropylcyclopentadiene was collected. The second part was washed with water, with hexane being added to hasten separation of the water layer. The hexane was removed from the water-insoluble portion by distillation at atmospheric pressure, and the residue was distilled under reduced pressure. Both isopropylcyclopentadiene and diisopropylcyclopentadiene were collected.

The over-all yield of diisopropylcyclopentadiene isomers was 32 percent, while the over-all yield of isopropylcyclopentadiene isomers was 6 percent.

*Example XV.—Preparation of isopropylcyclopentadiene and diisopropylcyclopentadiene*

To a three-liter rocking autoclave were charged 200 grams of dicyclopentadiene (1.5 moles), 900 grams of isopropanol (15 moles), and 100 grams of sodium hydroxide (2.5 moles). The autoclave was sealed and heated at a temperature of 250° C. for 2 hours. At the end of this time, the reaction mixture was cooled and washed with water, with hexane being added to dissolve the aqueous-insoluble product. The hexane was removed from the water-insoluble product by distillation at atmospheric pressure, and the residue was distilled under reduced pressure. About 75 grams of diisopropylcyclopentadiene (0.5 mole), and 20 grams of isopropylcyclopentadiene (0.18 mole), were collected. This represented a yield of 16.5 percent of diisopropylcyclopentadiene and 6 percent of isopropylcyclopentadiene.

*Example XVI.—Preparation of isopropylcyclopentadiene, diisopropylcyclopentadiene, isopropylcyclopentadiene dimer, and cyclopentadiene-isopropylcyclopentadiene codimer*

The procedure of Example III was repeated in a sixteen-foot length of coiled stainless steel tubing having an inner diameter of 3/16 inch and a volume of 60 cc. at a temperature of 290° C. and at a liquid hourly space velocity of 28 while employing a mole ratio of isopropanol to dicyclopentadiene of 10:1 and a potassium hydroxide concentration of 4 percent by weight.

The reaction product was distilled under atmospheric pressure in order to remove most of the unreacted isopropanol. The residue was washed with water, with hexane being added to dissolve the water-isoluble portion. The hexane solution was washed with water and the hexane was removed therefrom by distillation at atmospheric pressure. The residue was distilled under reduced pressure, and isopropylcyclopentadiene, diisopropylcyclopentadiene, a dimer of isopropylcyclopentadiene, and a codimer of cyclopentadiene and isopropylcyclopentadiene were recovered.

The isopropanol distilled from the reaction product was contacted with water. A water-insoluble fraction separated and this fraction was taken up in pentane. The pentane was removed by distillation and the residue was fractionally distilled. Additional isopropylcyclopentadiene, isopropylcyclopentadiene dimer, and cyclopentadiene-isopropylcyclopentadiene codimer were recovered.

The over-all yield of each product is set forth in Table II below:

TABLE II

| Product: | Yield, percent of theory |
|---|---|
| Isopropylcyclopentadiene | 6 |
| Diisopropylcyclopentadiene | 7.5 |
| Isopropylcyclopentadiene dimer | 12 |
| Cyclopentadiene-isopropylcyclopentadiene codimer | 14 |

Isopropylcyclopentadiene dimer exists in both the endo and exo form. Dimerization of isopropylcyclopentadiene to the endo form occurs at temperatures of from about 25° C. to about 75° C. At temperatures above about 200° C., both dimers are obtained. The endo form is less stable than the exo form and dedimerizes readily at temperatures of from about 160° C. to about 180° C.

The endo and exo dimers of isopropylcyclopentadiene were separated by heating their mixture to a temperature of 180° C. to 190° C. at 100 mm. Hg pressure to dedimerize the endo dimer, and distilling the isopropylcyclopentadiene produced thereby at a temperature of 64° C. to 67° C. at 100 mm. Hg pressure. When the pressure was reduced further, the exo dimer of isopropylcyclopentadiene distilled. The endo dimer of isopropylcyclopentadiene has a boiling point of 125° C. at 10 mm. Hg pressure, an index of refraction of 1.4932 at 20° C., and a density of 0.918 at 20° C. The exo dimer of isopropylcyclopentadiene has a boiling point of 97° C. at 1.8 mm. Hg pressure, an index of refraction of 1.4960 at 20° C., and a density of 0.910 at 20° C.

Cyclopentadiene-isopropylcyclopentadiene also exists in both the endo and exo form. Dimerization of cyclopentadiene and isopropylcyclopentadiene to the endo form occurs at temperatures of from about 25° C. to about 75° C. At temperatures above about 200° C., both dimers are obtained. The endo form is less stable than the exo form and dedimerizes readily at temperatures of from about 160° C. to about 180° C.

The endo and exo forms of cyclopentadiene-isopropylcyclopentadiene codimer were separated by heating their mixture to a temperature of 157° C. to 170° C. at 150 mm. Hg pressure to dedimerize the endo form, and distilling the isopropylcyclopentadiene produced thereby at a temperature of 71° C. to 75° C. at 150 mm. Hg pressure while catching the cyclopentadiene produced thereby in a cold trap. When the pressure was further reduced, the exo codimer distilled. The exo codimer has a boiling point of 64° C. at 5 mm. Hg pressure, an index of refraction of 1.4990 at 20° C., and a density of 0.935 at 20° C. The endo codimer has a boiling point of 87° C. at 7 mm. Hg pressure, an index of refraction of 1.5002 at 20° C., and a density of 0.938 at 20° C.

*Example XVII.—Preparation of dicyclohexylcyclopentadiene*

To a three-liter stainless steel rocking autoclave were charged 215 grams of dicyclopentadiene (1.6 moles), 800 grams of cyclohexanol (8 moles), and 100 grams of 85 percent by weight potassium hydroxide (1.5 moles). The autoclave was sealed and heated to a temperature of 250° C. over a 1 hour period, and then maintained at a temperature of 250±10° C. for 2 hours. At the end of this time, the reaction mixture was cooled and diluted with 1 liter of water, causing a green, oily layer to separate. This layer was removed and diluted with 500 milliliters of isopropyl ether. The resulting mixture was filtered to remove traces of solid impurities. The filtrate obtained from the filtration was washed with water several times until the wash water was neutral to pH paper. The ether was removed by distillation at atmospheric pressure, and the residue was distilled under reduced pressure. The distillate was redistilled and 116 grams of dicyclohexylcyclopentadiene (0.5 mole), boiling at a temperature of 127° C. at 0.6 mm. Hg pressure, were collected. This represented a yield of 16 percent of theoretical. The product had an index of refraction of 1.5220 at 20° C., a density of 0.958 at 20° C., and a molecular weight of 226 (calculated, 230), as determined by the freezing point depression of benzene. The infrared and ultraviolet absorption spectra of this product are consistent with that of dicyclohexylcyclopentadiene. The product was further identified by elemental analysis.

*Analysis.*—Calculated for $C_{17}H_{26}$: C, 88.6%; H, 11.4%. Found: C, 88.6%; H, 11.3%.

Nuclear magnetic resonance studies of refined dicyclohexylcyclopentadiene showed the presence of 1,3-dicyclohexylcyclopentadiene and 1,4-dicyclohexylcyclopentadiene.

*Example XVIII.—Preparation of dicyclohexylcyclopentadiene*

To a three-liter stainless steel rocking autoclave were charged 66 grams of dicyclopentadiene (1 mole), 2,000 grams of cyclohexanol (20 moles), and 33 grams of 85 percent by weight potassium hydroxide (0.5 mole). The autoclave was sealed and heated to a temperature of 250° C. over a period of 1 and ½ hours, and then maintained at a temperature of 250° C.±2° C. for 2 hours. At the end of this time, the reaction mixture was cooled and diluted with 1 liter of water, causing a yellow, oily layer to separate. This layer was removed and diluted with 500 milliliters of isopropyl ether. The resulting mixture was filtered to remove traces of solid impurities. The filtrate obtained from the filtration was washed with water several times until the wash water was neutral to pH paper. The ether was removed by distillation at atmospheric pressure, and the residue was distilled under reduced pressure. About 63 grams of crude dicyclohexylcyclopentadiene (0.27 mole) were collected. This represented a yield of crude product of 27 percent of theoretical.

*Example XIX.—Preparation of dicyclohexylcyclopentadiene and tricyclohexylcyclopentadiene*

To a three-liter stainless steel rocking autoclave were charged 66 grams of dicyclopentadiene (0.5 mole), 2,000 grams of cyclohexanol (20.0 moles), and 5 grams of 85 percent by weight potassium hydroxide (0.1 mole). The autoclave was sealed and heated at a temperature of 252° C. to 255° C. for 2 hours. At the end of this time, the reaction mixture was cooled and diluted with 1 liter of water, causing an oily layer to separate. This layer was removed and dissolved in 500 milliliters of isopropyl ether. The resulting solution was washed with water several times until the wash water was neutral. The ether was removed by distillation at atmospheric pressure, and the residue was distilled under reduced pressure. About 63 grams of dicyclohexylcyclopentadiene (0.27 mole), boiling at a temperature of 124° C. to 135° C. at 0.5 mm. Hg pressure, and 54 grams of tricyclohexylcyclopentadiene (0.17 mole), boiling at a temperature of 177° C. to 178° C. at 0.58 mm. Hg pressure, were collected. This represented a yield of 27 percent of dicyclohexylcyclopentadiene and 14 percent of tricyclohexylcyclopentadiene. The tricyclohexylcyclopentadiene had a molecular weight of 300 (calculated, 312.5), as determined by the freezing point depression of benzene. The ultraviolet absorption spectrum of this product was consistent with that of tricyclohexylcyclopentadiene. The product was further identified by elemental analysis.

*Analysis.*—Calculated for $C_{17}H_{25}$: C, 88.4%; H, 11.6%. Found: C, 88.8%; H, 11.6%.

Nuclear magnetic resonance studies of refined tricyclohexylcyclopentadiene showed the presence of 1,2,4-tricyclohexylcyclopentadiene and 1,3,5-tricyclohexylcyclopentadiene.

*Example XX.—Preparation of bis(1-phenylethyl)-cyclopentadiene*

To a three-liter stainless steel rocking autoclave were charged 135 grams of cyclopentadiene (2.0 moles), 854 grams of 1-phenylethanol (7.0 moles), and 50 grams of 85 percent by weight potassium hydroxide (0.75 mole). The autoclave was sealed and heated at a temperature of 250° C. for 2 hours. At the end of this time, the reaction mixture was cooled and washed with water several times, with hexane being added to dissolve the water-insoluble portion. The hexane was removed by distillation at atmospheric pressure, and the residue was distilled under reduced pressure. About 140 grams of bis(1-phenylethyl)cyclopentadiene (0.5 mole), boiling at a temperature of 166° C. at 1.5 mm. Hg pressure, were collected. This represented a yield of the crude product of 25 percent of theoretical. The product had an index of refraction of 1.6050 at 20° C., a density of 1.027 at 20° C., and a molecular weight of 274 (calculated, 274), as determined by the freezing point depression of benzene. The infrared absorption spectrum of this product was consistent with that of bis(1-phenylethyl)cyclopentadiene. The product was further identified by elemental analysis.

*Analysis.*—Calculated for $C_{12}H_{22}$: C, 92.0%; H, 8.0%. Found: C, 91.8%; H, 7.9%.

*Example XXI.—Preparation of (5-ethyl-2-nonyl)-cyclopentadiene*

To a three-liter stainless steel rocking autoclave were charged 132 grams of dicyclopentadiene (2 moles), 525 grams of 5-ethyl-2-nonanol (3 moles), and 25 grams of 85 percent by weight potassium hydroxide (0.4 mole). The autoclave was sealed and heated at a temperature of 225° C. to 234° C. for 4 hours. At the end of this time, the reaction mixture was cooled, washed with water several times, and distilled. About 25 grams of (5-ethyl-2-nonyl)cyclopentadiene were collected. The product had a molecular weight of 220 (calculated, 220), as determined cryoscopically. The infrared and ultraviolet spectra of the product were consistent with the proposed structure. Nuclear magnetic resonance studies showed the (5-ethyl-2-nonyl)cyclopentadiene to be a mixture of the 1-(5-ethyl-2-nonyl)cyclopentadiene and 2-(5-ethyl-2-nonyl)-cyclopentadiene isomers.

*Example XXII.—Preparation of methylisopropylcyclopentadiene and methyldiisopropylcyclopentadiene*

To a three-liter rocking autoclave were charged 240 grams of an isomeric mixture of 1-methylcyclopentadiene dimer and 2-methylcyclopentadiene dimer (1.5 moles), 900 grams of isopropanol (15 moles), and 100 grams of 85 percent by weight potassium hydroxide (1.5 moles). The autoclave was sealed and heated at a temperature of 250° C. for two hours. At the end of this time, the reaction mixture was washed with water, with hexane being added to dissolve the aqueous-insoluble product. The hexane was removed from the water-insoluble product by distillation at atmospheric pressure, and the residue was distilled under reduced pressure. About 56 grams of methylisopropylcyclopentadiene (0.46 mole), boiling at a temperature of 143° C. to 145° C. at 20 mm. Hg. pressure, and 178 grams of methyldiisopropylcyclopentadiene (1.09 moles), boiling at a temperature of 86° C. to 90° C. at 20 mm. Hg. pressure, were collected.

The two products were composed of a mixture of isomers. The methylisopropylcyclopentadiene consisted of the 1-methyl-3-isopropylcyclopentadiene, 1-methyl-4-isopropylcyclopentadiene, and 2-methyl-4-isopropylcyclopentadiene isomers, while the methyldiisopropylcyclopentadiene consisted of the 1-methyl-3,4-diisopropylcyclopentadiene, 1 - methyl - 3,5 - diisopropylcyclopentadiene, 1-methyl-2,4-diisopropylcyclopentadiene, 2-methyl-1,4-diisoproplycyclopentadiene, and 2-methyl-4,5-diisopropylcyclopentadiene isomers. The isomers were identified by nuclear magnetic resonance studies.

The yield of methylisopropylcyclopentadiene was 15 percent, and the yield of methyldiisopropylcyclopentadiene was 36 percent. The infrared absorption spectra of the two products were consistent with that of methylisopropylcyclopentadiene and methyldiisopropylcyclopentadiene. The methylisopropylcyclopentadiene had an index of refraction of 1.4620 at 20° C., a density of 0.812 at 20° C., and a molecular weight of 122 (calculated, 122), as determined by the freezing point depression of benzene. The methyldiisopropylcyclopentadiene had an index of refraction of 1.4665 at 20° C., a density of 0.827 at 20° C., and a molecular weight of 159 (calculated, 164), as determined by the freezing point depression of benzene. The methyldiisopropylcyclopentadiene was further identified by elemental analysis.

*Analysis.*—Calculated for $C_{12}H_{20}$: C, 87.8%; H, 12.2%. Found: C, 87.5%; H, 12.0%.

*Example XXIII.—Preparation of diisopropylcyclopentadiene*

To a one-liter rocking autoclave were charged 60 grams of an isomeric mixture of 1-isopropylcyclopentadiene and 2-isopropylcyclopentadiene (0.556 mole), 300 grams of isopropanol (5.0 moles), and 25 grams of 85 percent by weight potassium hydroxide (0.37 mole). The autoclave was sealed and heated at a temperature of 250° C. for 2 hours. At the end of this time, the reaction mixture was washed with water, with hexane being added to dissolve the aqueous-insoluble product. The hexane was removed from the water-insoluble product by distillation at atmospheric pressure, and the residue was distilled under reduced pressure. About 40 grams of diisopropylcyclopentadiene (0.26 mole) were collected. This represented a yield of 47 per cent of theoretical.

The diisopropylcyclopentadiene consisted of a mixture of the 1,3-diisopropylcyclopentadiene and 1,4-diisopropylcyclopentadiene isomers. The isomers were identified by nuclear magnetic resonance studies.

*Example XXIV.—Alkylation of cyclopentadiene with ethanol*

A sixteen-foot length of coiled stainless steel tubing having an inner diameter of ⅜ inch and a volume of 350 cc., along with an attached receiver, was pressurized to a pressure of 4,000 p.s.i. at a temperature of about 290° C. After a pre-run feed was fed through the tubing, a solution of 6.8 percent by weight of dicyclopentadiene and 4.6 percent by weight of 85 percent by weight potassium hydroxide in ethanol was fed to the system at a liquid hourly space velocity of 30 while the temperature and pressure were maintained constant.

A total of 2,992 grams of the mixture was processed so that the available cyclopentadiene amounted to 3.1 moles (203 grams). About 2,970 grams of liquid reaction product were recovered. A portion of this product, amounting to 2,800 grams, was washed with water, with pentane being added to dissolve the aqueous-insoluble product. The pentane was removed from the water-insoluble product by distillation at atmospheric pressure, and the residue was distilled under reduced pressure. Two distillation plateaus were observed, and the fractions collected at each plateau were combined and redistilled. About 40 grams of 1,2,4-triethylcyclopentadiene (0.27 mole), and 45 grams of 1,2,3,4-tetraethylcyclopentadiene (0.25 mole), were collected.

The yield of 1,2,4-triethylcyclopentadiene was 9.2 percent of theoretical and the yield of 1,2,3,4-tetraethylcyclopentadiene was 8.6 percent of theoretical. The infrared absorption spectra of the two products were consistent with that of 1,2,4-triethylcyclopentadiene and 1,2,3,4-tetraethylcyclopentadiene. These products were further identified by nuclear magnetic resonance studies. The 1,2,4-triethylcyclopentadiene had a boiling point of 92° C. at 52 mm. Hg pressure, an index of refraction of 1.4722 at 20° C., a density of 0.834 at 20° C., and a molecular weight of 151 (calculated, 150), as determined by the freezing point depression of benzene. The 1,2,3,4-tetraethylcyclopentadiene had a boiling point of 101° C. at 20 mm. Hg pressure, an index of refraction of 1.4792 at 20° C., a density of 0.850 at 20° C., and a molecular weight of 171 (calculated, 178).

*Example XXV.—Alkylation of cyclopentadiene with ethanol*

The procedure of Example XXIV was repeated at a temperature of 250° C. The dicyclopentadiene feed amounted to 576 grams. The reaction product was washed with water and then distilled under reduced pressure. The distillate boiling at a temperature of 80° C. to 91° C. at 10 mm. Hg pressure was collected and redistilled on an eighteen-inch Vigreaux column. About 41.3 grams of a codimer of ethylcyclopentadiene and cyclopentadiene were collected. A portion of the codimer was distilled at a temperature of 180 to 196° C. at 400 to 408 mm. Hg pressure. Part of the distillate was again redistilled on a six-inch Vigreaux column, and 5 grams of ethylcyclopentadiene were collected. The ethylcyclopentadiene has a boiling point of 46° C. at 100 mm. Hg pressure and an index of refraction of 1.4561 at 20° C. This product was a mixture of 1-ethylcyclopentadiene and 2-ethylcyclopentadiene, as shown by infrared, ultra-violet, and nuclear magnetic resonance studies.

The ethylcyclopentadiene-cyclopentadiene codimer had a boiling point of 74° C. at 10 mm. Hg pressure, an index of refraction of 1.5060 at 20° C., and a molecular weight of 155 (calculated, 160), as determined by the freezing point depression of benzene.

*Analysis:* C, 89.4% (calculated, 89.9%); H, 9.9% (calculated, 10.1%).

*Example XXVI.—Alkylation of cyclopentadiene with 2-ethylbutanol*

The procedure of Example XXIV was repeated at a liquid hourly space velocity of 26 employing a feed mixture prepared by dissolving 2.0 moles of sodium in 15.0 moles of 2-ethylbutanol and adding 1.5 moles of dicyclopentadiene. During the run, 113 grams (0.85 mole) of dicyclopentadiene, 763 grams (7.5 moles) of 2-ethylbutanol, and 124 grams (1.0 mole) of sodium 2-ethylbutoxide were processed. The reaction product was washed with water and then distilled under reduced pressure. The distillate boiling at a temperature of 75° C. to 99° C. at 10 mm. Hg pressure was collected and redistilled. About 5 grams of (2-ethylbutyl)cyclopentadiene and 6 grams of (2-ethylbutyl)-cyclopentadiene dimer were collected. The two products were identified by their infrared and ultraviolet absorption spectra as well as by elemental analysis. Nuclear magnetic resonance studies showed the (2-ethylbutyl)cyclopentadiene to be a mixture of the 1-(2-ethylbutyl)cyclopentadiene and 2-(2-ethylbutyl)cyclopentadiene isomers.

The (2-ethylbutyl)cyclopentadiene had a boiling point of 34 to 35° C. at 12 mm. Hg pressure and an index of refraction of 1.4789 at 20° C. The (2-ethylbutyl)cyclopentadiene dimer had a boiling point of 125 to 126° C. at 11 mm. Hg pressure and an index of refraction of 1.5031 at 20° C.

*Analysis of monomer*: C, 87.7% (calculated 87.9%); H, 11.8% (calculated 12.0%).

*Analysis of Dimer*: C, 87.6% (calculated 87.9%); H, 11.8% (calculated 12.1%).

What is claimed is:
1. The cyclopentadiene derivatives selected from the group consisting of compounds represented by the general formulas
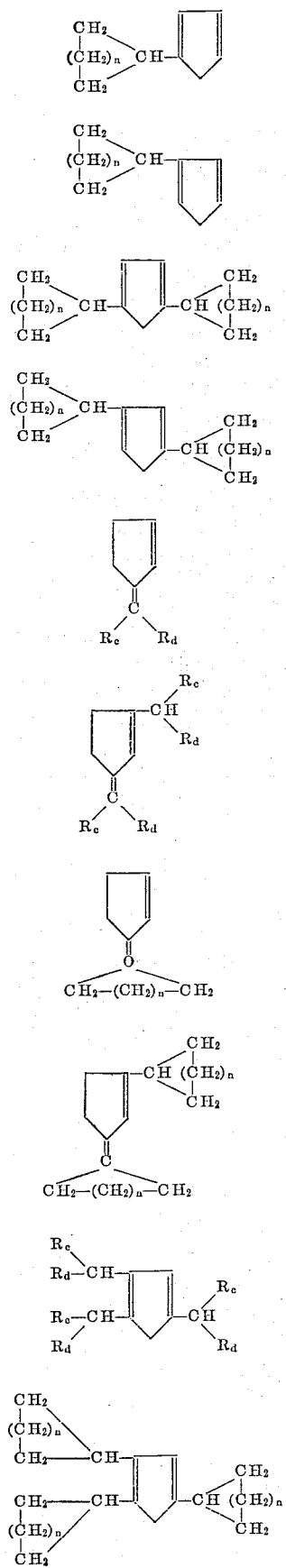
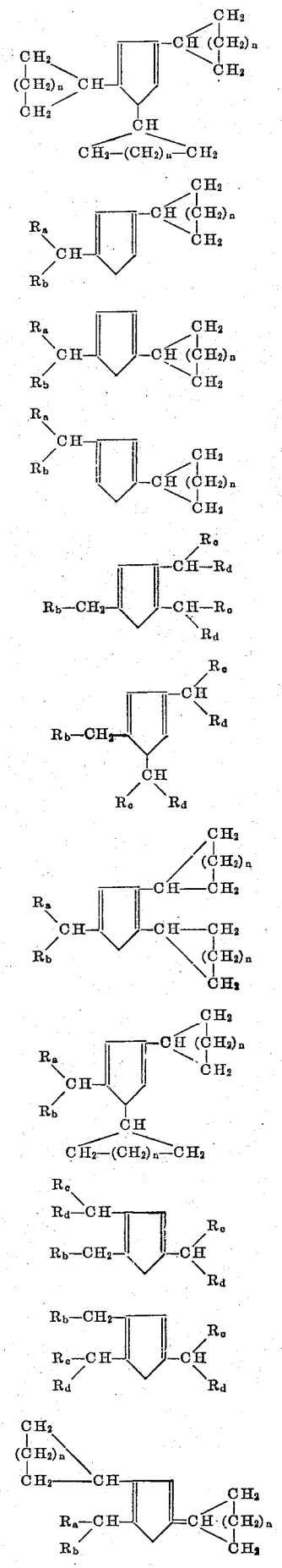

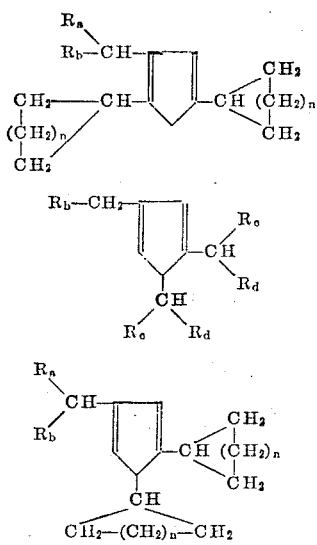

wherein $R_a$ and $R_b$ are radicals selected from the group consisting of hydrogen and alkyl radicals having from 1 to 10 carbon atoms, $R_c$ and $R_d$ are hydrocarbon radicals free of aliphatic unsaturation having from 1 to 10 carbon atoms, and $n$ is an integer having a value of from 0 to 10.

2. 1,3-dicyclohexylcyclopentadiene.
3. 1,4-dicyclohexylcyclopentadiene.
4. 1,3-bis(1-phenylethyl)cyclopentadiene.
5. 1,4-bis(1-phenylethyl)cyclopentadiene.
6. 3-isopropylidenecyclopentene.
7. 1-isopropyl-3-isopropylidenecyclopentene.
8. 1,2,4-tricyclohexylcyclopentadiene.
9. 1,3,5-tricyclohexylcyclopentadiene.
10. 1-(5-ethyl-2-nonyl)cyclopentadiene.
11. 2-(5-ethyl-2-nonyl)cyclopentadiene.
12. 1-methyl-4-isopropylcyclopentadiene.
13. 1,2-diisopropyl-4-methylcyclopentadiene.
14. 1-methyl-3,5-diisopropylcyclopentadiene.
15. 1-methyl-2,4-diisopropylcyclopentadiene.
16. 1,4-diisopropyl-2-methylcyclopentadiene.
17. 1,5-diisopropyl-3-methylcyclopentadiene.
18. 1-(2-ethylbutyl)cyclopentadiene.
19. 2-(2-ethylbutyl)cyclopentadiene.

20. A process for producing alkylated cyclopentadiene derivatives which comprises reacting a cyclopentadiene selected from the group consisting of

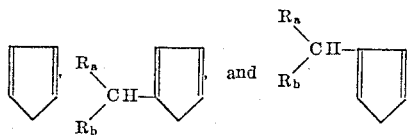

wherein $R_a$ and $R_b$ are radicals selected from the group consisting of hydrogen and alkyl radicals having from 1 to 10 carbon atoms, with an alcohol selected from the group consisting of

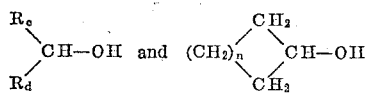

wherein $R_c$ is a member selected from the group consisting of hydrogen and hydrocarbon radicals free of aliphatic unsaturation having from 1 to 10 carbon atoms, $R_d$ is a hydrocarbon radical free of aliphatic unsaturation having from 1 to 10 carbon atoms, and $n$ is an integer having a value of from 0 to 10, in contact with a member selected from the group consisting of sodium hydroxide, sodium alkoxide, potassium hydroxide, and potassium alkoxide.

21. A process which comprises reacting cyclopentadiene with isopropanol in contact with a member selected from the group consisting of sodium hydroxide, sodium alkoxide, potassium hydroxide, and potassium alkoxide.

22. A process which comprises reacting cyclopentadiene with cyclohexanol in contact with a member selected from the group consisting of sodium hydroxide, sodium alkoxide, potassium hydroxide, and potassium alkoxide.

23. A process which comprises reacting cyclopentadiene with 1-phenylethanol in contact with a member selected from the group consisting of sodium hydroxide, sodium alkoxide, potassium hydroxide, and potassium alkoxide.

24. A process which comprises reacting cyclopentadiene with 5-ethyl-2-nonanol in contact with a member selected from the group consisting of sodium hydroxide, sodium alkoxide, potassium hydroxide, and potassium alkoxide.

25. A process which comprises reacting a member selected from the group consisting of 1-methylcyclopentadiene and 2-methylcyclopentadiene with isopropanol in contact with a member selected from the group consisting of sodium hydroxide, sodium alkoxide, potassium hydroxide, and potassium alkoxide.

26. A process which comprises reacting a member selected from the group consisting of 1-isopropylcyclopentadiene and 2-isopropylcyclopentadiene with isopropanol in contact with a member selected from the group consisting of sodium hydroxide, sodium alkoxide, potassium hydroxide, and potassium alkoxide.

27. A process which comprises reacting cyclopentadiene with ethanol in contact with a member selected from the group consisting of sodium hydroxide, sodium alkoxide, potassium hydroxide, and potassium alkoxide.

28. A process which comprises reacting cyclopentadiene with 2-ethylbutanol in contact with a member selected from the group consisting of sodium hydroxide, sodium alkoxide, potassium hydroxide, and potassium alkoxide.

References Cited by the Examiner

UNITED STATES PATENTS 3,051,765   8/1962   McCain ———————— 260—666

OTHER REFERENCES

Alder et al., "Uber die Darstellung von Santen und andersen substituierten Bicyclo-1.2.2.-Heptene," Berichte, vol. 95 (1962), pages 503–10.

Egloff: Physical Constants of Hydrocarbons (1940), vol. II, pages 404, 405.

Faraday's Encyclopedia of Hydrocarbon Compounds, vol. 4 (1947), page 09081.00.11.

Riemschneider et al.: Chemical Abstracts, vol. 53, No. 11 (1959), pages 10062g–10063f.

DELBERT E. GANTZ, *Primary Examiner*.

PAUL M. COUGHLAN, JR., ALPHONSO D. SULLIVAN, *Examiners*.

P. P. GARVIN, L. FORMAN, C. E. SPRESSER,
*Assistant Examiners.*